(12) United States Patent
Shin

(10) Patent No.: US 12,346,634 B2
(45) Date of Patent: *Jul. 1, 2025

(54) CONTEXTUAL ASSISTANT USING MOUSE POINTING OR TOUCH CUES

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,643

(22) Filed: Jun. 8, 2023

(65) Prior Publication Data

US 2023/0325148 A1    Oct. 12, 2023

Related U.S. Application Data

(63) Continuation of application No. 17/717,292, filed on Apr. 11, 2022, now Pat. No. 11,709,653.

(51) Int. Cl.
*G06F 3/16* (2006.01)
*G06F 3/01* (2006.01)
(Continued)

(52) U.S. Cl.
CPC ............ *G06F 3/167* (2013.01); *G06F 3/017* (2013.01); *G06F 3/038* (2013.01); *G06F 3/0481* (2013.01);
(Continued)

(58) Field of Classification Search
CPC ......... G10L 2015/228; G10L 2015/223; G10L 15/22; G06F 2203/0381; G06F 16/685;
(Continued)

(56) References Cited

U.S. PATENT DOCUMENTS 9,841,879 B1 * 12/2017 Gray ................... G06F 3/04847
2003/0046062 A1 * 3/2003 Cartus .................. G06F 40/166
704/10
(Continued)

FOREIGN PATENT DOCUMENTS

KR      20140136310 A    11/2014

OTHER PUBLICATIONS

USPTO. Office Action relating to U.S. Appl. No. 17/717,292, dated Nov. 16, 2022.
International Search Report and Written Opinion for the related Application No. PCT/US2023/018044 dated Jun. 29, 2023, 210 pages.

*Primary Examiner* — Nitin Patel
*Assistant Examiner* — Cory A Almeida
(74) *Attorney, Agent, or Firm* — Honigman LLP; Brett A. Krueger; Grant Griffith

(57) ABSTRACT

A method for a contextual assistant to use mouse pointing or touch cues includes receiving audio data corresponding to a query spoken by a user, receiving, in a graphical user interface displayed on a screen, a user input indication indicating a spatial input applied at a first location on the screen, and processing the audio data to determine a transcription of the query. The method also includes performing query interpretation on the transcription to determine that the query is referring to an object displayed on the screen without uniquely identifying the object, and requesting information about the object. The method further includes disambiguating, using the user input indication indicating the spatial input applied at the first location on the screen, the query to uniquely identify the object that the query is referring to, obtaining the information about the object requested by the query, and providing a response to the query.

10 Claims, 7 Drawing Sheets

(51) Int. Cl.
*G06F 3/038* (2013.01)
*G06F 3/0481* (2022.01)
*G06F 3/0488* (2022.01)
*G06F 16/683* (2019.01)
*G10L 15/22* (2006.01)

(52) U.S. Cl.
CPC .......... *G06F 3/0488* (2013.01); *G06F 16/685* (2019.01); *G10L 15/22* (2013.01); *G06F 2203/0381* (2013.01); *G10L 2015/223* (2013.01); *G10L 2015/228* (2013.01)

(58) Field of Classification Search
CPC ...... G06F 3/167; G06F 3/0488; G06F 3/0481; G06F 3/038; G06F 3/017
See application file for complete search history.

(56) References Cited

U.S. PATENT DOCUMENTS

| | | |
|---|---|---|
| 2013/0086105 A1 | 4/2013 | Hammontree et al. |
| 2013/0121571 A1 | 5/2013 | Gokturk et al. |
| 2014/0039341 A1 | 2/2014 | Bohorquez et al. |
| 2014/0089298 A1 | 3/2014 | Haveliwala |
| 2015/0042570 A1 | 2/2015 | Lombardi et al. |
| 2016/0360382 A1 | 12/2016 | Gross et al. |
| 2018/0335928 A1* | 11/2018 | Van Os ................ G06Q 20/204 |
| 2018/0336009 A1* | 11/2018 | Yoganandan ......... G06F 3/0346 |
| 2019/0080169 A1 | 3/2019 | Nowak-Przygodzki et al. |
| 2019/0179946 A1 | 6/2019 | Cui et al. |
| 2020/0311195 A1* | 10/2020 | Mishra ................ G06F 40/253 |
| 2021/0233532 A1 | 7/2021 | Kudurshian et al. |
| 2021/0405965 A1 | 12/2021 | Chan |

* cited by examiner

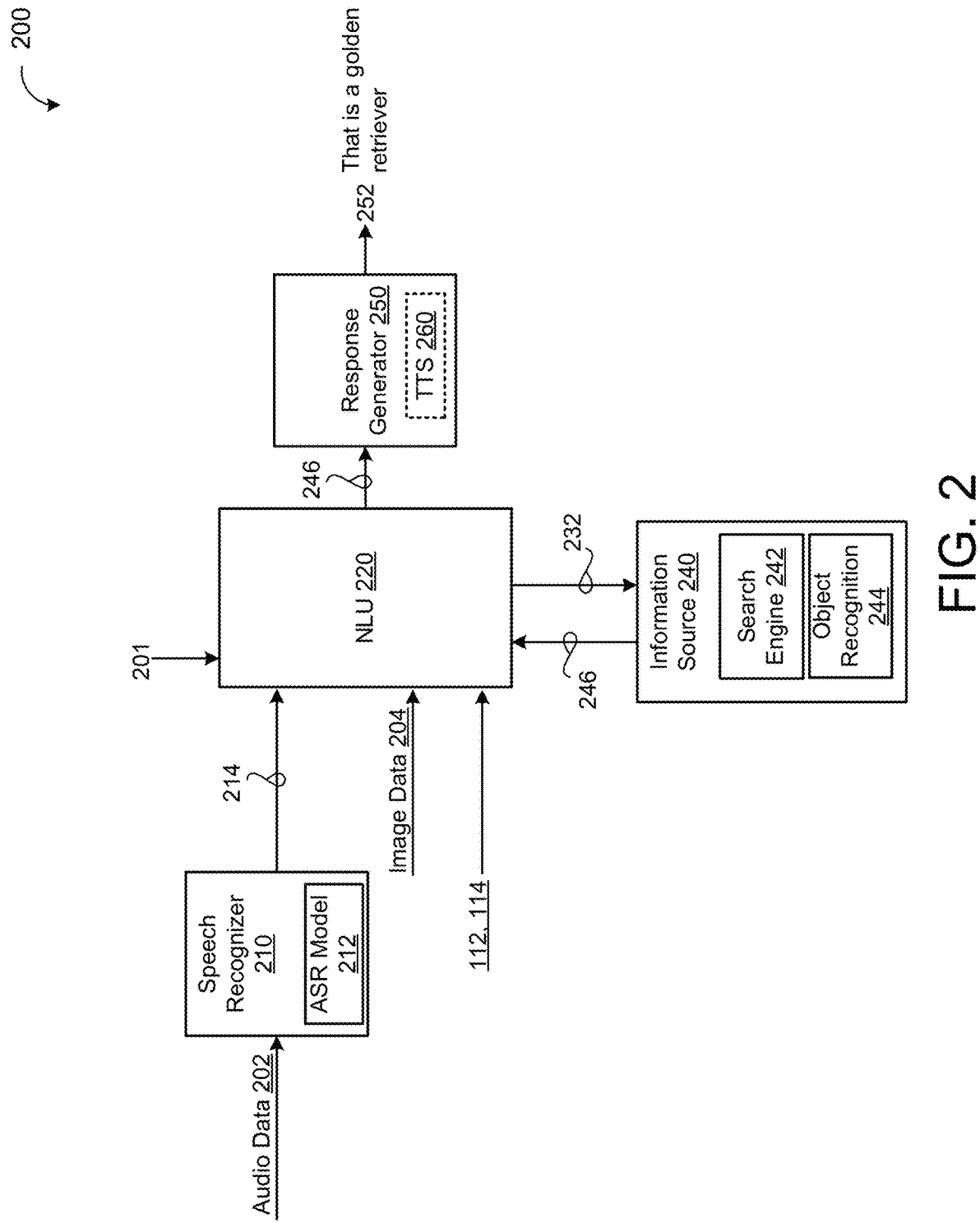

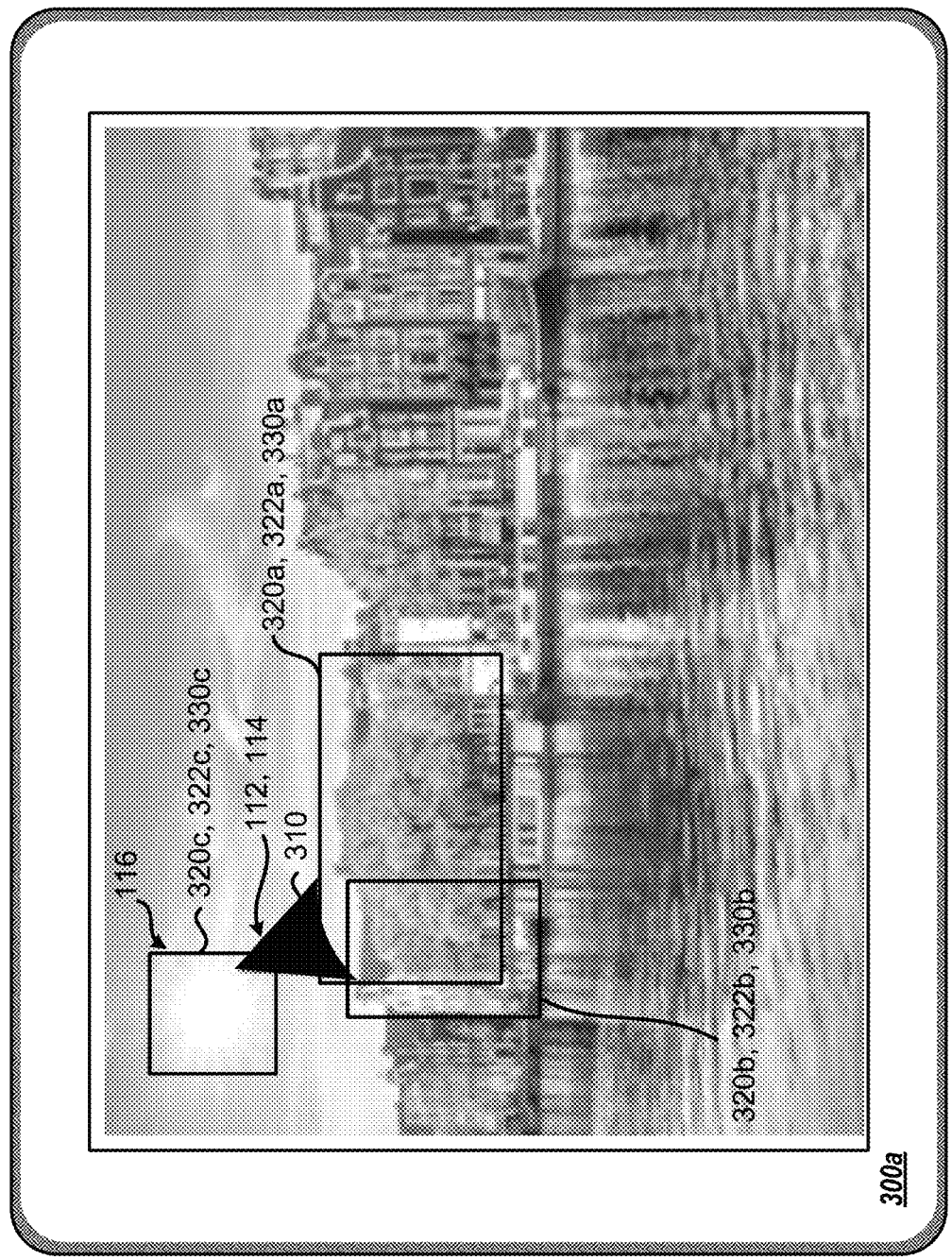

CONTEXTUAL ASSISTANT USING MOUSE POINTING OR TOUCH CUES

CROSS-REFERENCE TO RELATED APPLICATIONS

This U.S. patent application is a continuation of, and claims priority under 35 U.S.C. § 120 from, U.S. patent application Ser. No. 17/717,292, filed on Apr. 11, 2022. The disclosure of this prior application is considered part of the disclosure of this application and is hereby incorporated by reference in its entirety.

TECHNICAL FIELD

This disclosure relates to a contextual assistant using mouse pointing or touch cues.

BACKGROUND

A speech-enabled environment permits a user to speak a query aloud and a digital assistant will perform an action to obtain an answer to the query. Digital assistants are particularly effective in providing accurate answers to general topic queries, where the query itself generates the necessary information for the digital assistant to obtain an answer to the query. However, where a query is ambiguous, the digital assistant requires additional context before it can obtain an answer to the query. In some instances, identifying the attention of the user when the user spoke the query aloud provides the additional context needed to obtain an answer to the query. Consequently, the digital assistant that receives the query must have some way of identifying additional context of the user that spoke the query.

SUMMARY

One aspect of the disclosure provides a computer-implemented method that when executed by data processing hardware causes the data processing hardware to perform operations that include receiving audio data corresponding to a query spoken by a user and captured by an assistant-enabled device associated with the user. The operations also include receiving, in a graphical user interface (GUI) displayed on a screen in communication with the data processing hardware, a user input indication indicating a spatial input applied at a first location on the screen, and processing, using a speech recognition model, the audio data to determine a transcription of the query. The operations also include performing query interpretation on the transcription of the query to determine that the query is referring to an object displayed on the screen without uniquely identifying the object and requesting information about the object displayed on the screen. The operations also include disambiguating, using the user input indication indicating the spatial input applied at the first location on the screen, the query to uniquely identify the object that the query is referring to, and in response to uniquely identifying the object, obtaining the information about the object requested by the query. The operations also include providing a response to the query that includes the obtained information about the object.

Implementations of the disclosure may include one or more of the following optional features. In some implementations, the operations also include detecting a trigger event, and in response to detecting the trigger event, activating: the GUI displayed on the screen to enable detection of spatial inputs; and the speech recognition model to enable the performance of speech recognition on incoming audio data captured by the assistant-enabled device. In these implementations, detecting the trigger event includes detecting, by a hotword detector, a presence of a hotword in the received audio data. Alternatively, detecting the trigger event may include one of: receiving, in the GUI displayed on the screen, a user input indication indicating selection of a graphical element; receiving a user input indication indicating selection of a physical button disposed on the assistant-enabled device; detecting a predefined gesture performed by the user; or detecting a predefined movement/pose of the assistant-enabled device.

In some examples, receiving the user input indication indicating the spatial input applied at the first location comprises one of: detecting that a position of a cursor is displayed in the GUI at the first location when the user spoke the query; detecting a touch input received in the GUI at the first location when the user spoke the query; or detecting a lassoing action performed in the GUI at the first location when the user spoke the query. In these examples, disambiguating the query to uniquely identify the object includes: receiving image data including a plurality of candidate objects displayed in the GUI and corresponding locations of the plurality of candidate objects displayed in the GUI; and identifying the candidate object from the plurality of candidate objects having the corresponding location that is closest to the first location as the object the query is referring to.

In additional examples, receiving the user input indication indicating the spatial input applied at the first location includes receiving the user input indication indicating the spatial input applied at the first location, and disambiguating the query to uniquely identify the object includes uniquely identifying the sequence of characters underlined by the underlining action as the object the query is referring to. In other examples, receiving the user input indication indicating the spatial input applied at the first location includes detecting a highlighting action performed in the GUI that highlights a sequence of characters displayed in the GUI at the first location, and disambiguating the query to uniquely identify the object includes uniquely identifying the sequence of characters highlighted by the highlighting action as the object the query is referring to.

In some implementations, obtaining the information about the object requested by the query includes: querying a search engine using the uniquely identified object and one or more terms in the transcription of the query to obtain a list of results responsive to the query; and displaying, in the GUI displayed on the screen, the list of results responsive to the query. Here, displaying the list of results responsive to the query may further include generating a graphical element representing a highest ranked result in the list of results responsive to the query and displaying, in the GUI displayed on the screen, the list of results responsive to the query at the first location on the screen. Optionally, the operations may further include determining that the uniquely identified object includes text in a first language such that obtaining the information about the object requested by the query includes obtaining a translation of the text in a second language different than the first language.

Another aspect of the disclosure provides a system including data processing hardware and memory hardware in communication with the data processing hardware. The memory hardware stores instructions that when executed on the data processing hardware causes the data processing hardware to perform operations that include receiving audio data corresponding to a query spoken by a user and captured by an assistant-enabled device associated with the user. The operations also include receiving, in a graphical user interface (GUI) displayed on a screen in communication with the data processing hardware, a user input indication indicating a spatial input applied at a first location on the screen, and processing, using a speech recognition model, the audio data to determine a transcription of the query. The operations also include performing query interpretation on the transcription of the query to determine that the query is referring to an object displayed on the screen without uniquely identifying the object and requesting information about the object displayed on the screen. The operations also include disambiguating, using the user input indication indicating the spatial input applied at the first location on the screen, the query to uniquely identify the object that the query is referring to, and in response to uniquely identifying the object, obtaining the information about the object requested by the query. The operations also include providing a response to the query that includes the obtained information about the object.

This aspect may include one or more of the following optional features. In some implementations, the operations also include detecting a trigger event, and in response to detecting the trigger event, activating: the GUI displayed on the screen to enable detection of spatial inputs; and the speech recognition model to enable the performance of speech recognition on incoming audio data captured by the assistant-enabled device. In these implementations, detecting the trigger event includes detecting, by a hotword detector, a presence of a hotword in the received audio data. Alternatively, detecting the trigger event may include one of: receiving, in the GUI displayed on the screen, a user input indication indicating selection of a graphical element; receiving a user input indication indicating selection of a physical button disposed on the assistant-enabled device; detecting a predefined gesture performed by the user; or detecting a predefined movement/pose of the assistant-enabled device In some examples, receiving the user input indication indicating the spatial input applied at the first location comprises one of: detecting that a position of a cursor is displayed in the GUI at the first location when the user spoke the query; detecting a touch input received in the GUI at the first location when the user spoke the query; or detecting a lassoing action performed in the GUI at the first location when the user spoke the query. In these examples, disambiguating the query to uniquely identify the object includes: receiving image data including a plurality of candidate objects displayed in the GUI and corresponding locations of the plurality of candidate objects displayed in the GUI; and identifying the candidate object from the plurality of candidate objects having the corresponding location that is closest to the first location as the object the query is referring to.

In additional examples, receiving the user input indication indicating the spatial input applied at the first location includes receiving the user input indication indicating the spatial input applied at the first location, and disambiguating the query to uniquely identify the object includes uniquely identifying the sequence of characters underlined by the underlining action as the object the query is referring to. In other examples, receiving the user input indication indicating the spatial input applied at the first location includes detecting a highlighting action performed in the GUI that highlights a sequence of characters displayed in the GUI at the first location, and disambiguating the query to uniquely identify the object includes uniquely identifying the sequence of characters highlighted by the highlighting action as the object the query is referring to.

In some implementations, obtaining the information about the object requested by the query includes: querying a search engine using the uniquely identified object and one or more terms in the transcription of the query to obtain a list of results responsive to the query; and displaying, in the GUI displayed on the screen, the list of results responsive to the query. Here, displaying the list of results responsive to the query may further include generating a graphical element representing a highest ranked result in the list of results responsive to the query and displaying, in the GUI displayed on the screen, the list of results responsive to the query at the first location on the screen. Optionally, the operations may further include determining that the uniquely identified object includes text in a first language such that obtaining the information about the object requested by the query includes obtaining a translation of the text in a second language different than the first language.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2 is a schematic view of example components of the contextual assistant.

FIGS. 3A-3C are example graphical user interfaces (GUIs) rendered on a screen of a user device including the contextual assistant.

Like reference symbols in the various drawings indicate like elements.

DETAILED DESCRIPTION

A user's manner of interacting with an assistant-enabled device is designed to be primarily, if not exclusively, by means of voice input. While assistant-enabled devices are effective at obtaining answers to general topic queries (e.g., what's the capital of Michigan?), context-driven queries require the assistant-enable device to obtain additional information to obtain an accurate answer. For instance, the assistant-enabled device may struggle to obtain a confident/accurate answer to the query "show me more of these," without more context.

In scenarios where the spoken query requires additional context to answer the query, the assistant-enabled device benefits from including image data derived from a screen of the assistant-enabled device. For instance, a user might query the assistant-enabled device in a natural manner by speaking "Show me more windows like that." Here, the spoken query identifies that the user is looking for windows similar to an object but is ambiguous because the object is unknown from the linguistic content of the query. Using image data from the screen of the assistant-enabled device may allow the assistant-enabled device to narrow the potential windows to search for from an entire screen showing a city down to a distinct subregion including a specific building in the city where a user input applied at a particular location on the screen has been detected in conjunction with the spoken query. By including input data and image data in conjunction with the query, the assistant-enable device is able to generate a response to a query about the building in the city despite the user needing to explicitly identify the building in the spoken query.

Figure 1:
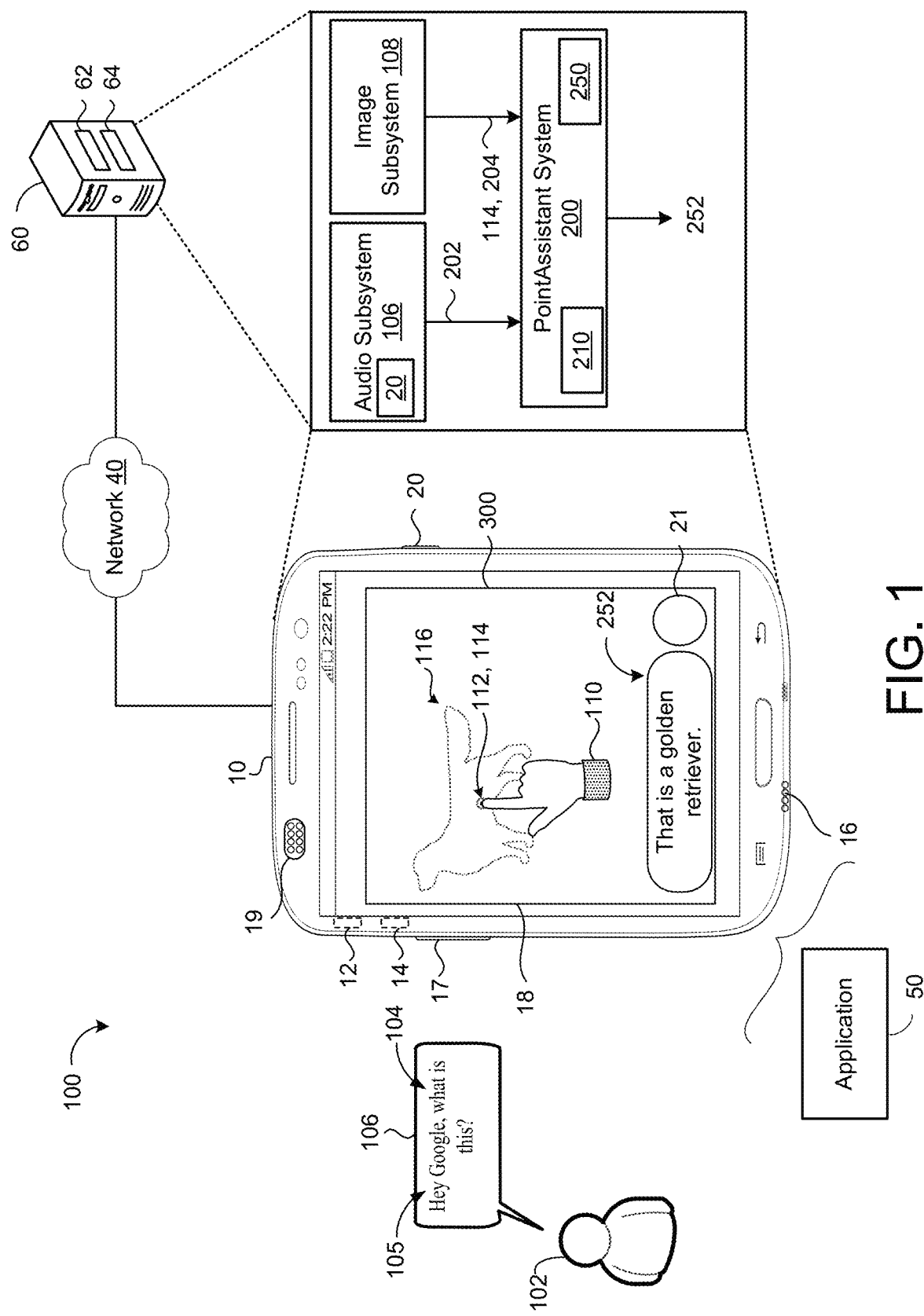
FIG. 1 is a schematic view of an example system including a contextual assistant using mouse pointing or touch cues.

FIG. 1 is an example of a system 100 including a user device 10 and/or a remote system 60 in communication with the user device 10 via a network 40. The user device 10 and/or the remote system 60 executes a point assistant 200 that a user 102 may interact with through speech and spatial inputs such that the point assistant 200 is capable of generating responses to queries referring to objects displayed on a screen of the user device 10, despite the query failing to uniquely identify an object for which the query seeks information. In the example shown, the user device 10 corresponds to a smart phone, however the user device 10 can include other computing devices having, or in communication with, display screens, such as, without limitation, a tablet, smart display, desktop/laptop, smart watch, smart appliance, smart glasses/headset, or vehicle infotainment device. The user device 10 includes data processing hardware 12 and memory hardware 14 storing instructions that when executed on the data processing hardware 12 cause the data processing hardware 12 to perform operations. The remote system 60 (e.g., server, cloud computing environment) also includes data processing hardware 62 and memory hardware 64 storing instructions that when executed on the data processing hardware 62 cause the data processing hardware 62 to perform operations. As described in greater detail below, the point assistant 200 executing on the user device 10 and/or the remote system 60 includes a speech recognizer 210 and a response generator 250, and has access to one or more information sources 240 stored on the memory hardware 14, 64. In some examples, execution of the point assistant 200 is shared across the user device 10 and the remote system 60.

The user device 10 includes an array of one or more microphones 16 configured to capture acoustic sounds such as speech directed toward the user device 10. The user device 10 also executes, for display on a screen 18 in communication with the data processing hardware 12, a graphical user interface (GUI) 300 configured to capture user input indications via any one of touch, gesture, gaze, and/or an input device (e.g., mouse, trackpad, or stylist) for controlling functionality of the user device 10. The GUI 300 may be an interface associated with an application 50 executing on the user device that presents a plurality of objects in the GUI 300. The user device 10 may further include, or be in communication with, an audio output device (e.g., a speaker) 19 that may output audio such as music and/or synthesized speech from the point assistant 200. The user device 10 may also include a physical button 17 disposed on the user device 10 and configured to receive a tactile selection by a user 102 for invoking the point assistant 200.

The user device 10 may include an audio subsystem 106 for extracting audio data 202 (FIG. 2) from a query 104. For instance, referring to FIG. 1, the audio subsystem 106 may receive streaming audio captured by the one or more microphones 16 of the user device 10 that corresponds to an utterance 106 of a query 104 spoken by the user 102 and extract the audio data (e.g., acoustic frames) 202. The audio data 202 may include acoustic features such as Mel-frequency cepstrum coefficients (MFCCs) or filter bank energies computed over windows of an audio signal. In the example shown, the query 104 spoken by the user 102 includes "Hey Google, what is this?"

The user device 10 may execute (i.e., on the data processing hardware 12) a hotword detector 20 configured to detect a presence of a hotword 105 in streaming audio without performing semantic analysis or speech recognition processing on the streaming audio. The hotword detector 20 may execute on the audio subsystem 106. The hotword detector 202 may receive the audio data 202 to determine whether the utterance 106 includes a particular hotword 105 (e.g., Hey Google) spoken by the user 102. That is, the hotword detector 20 may be trained to detect the presence of the hotword 105 (e.g., Hey Google) or one or more other variants of the hotword (e.g., Ok Google) in the audio data 202. Detecting the presence of the hotword 105 in the audio data 202 may correspond to a trigger event that invokes the point assistant 200 to activate the GUI 300 displayed on the screen 18 to enable the detection of spatial inputs 112, and activate the speech recognizer 210 to perform speech recognition on the audio data 202 corresponding to the utterance 106 of the hotword 105 and/or one or more other terms characterizing the query 104 that follows the hotword. In some examples, the hotword 105 is spoken in the utterance 106 subsequent to the query 105 such the portion of the audio data 202 characterizing the query 104 is buffered and retrieved by the speech recognizer 210 retrieves a portion of the audio data 202 upon detection of the hotword 105 in the audio data 202. In some implementations, the trigger event includes receiving, in the GUI 300, a user input indication indicating selection of a graphical element 21 (e.g., a graphical microphone). In other implementations, the trigger event includes receiving a user input indication indicating selection of the physical button 17 disposed on the user device 10. In other implementations, the trigger event includes detecting (e.g., via image and/or radar sensors) a predefined gesture performed by the user 102, or detecting a predefined movement/pose of the user device 10 (e.g., using one or more sensors such as an accelerometer and/or gyroscope).

The user device 10 may further include an image subsystem 108 configured to extract a location 114 (e.g., an X-Y coordinate location) on the screen 18 of a spatial input 112 applied in the GUI 300. For example, the user 102 may provide a user input indication 110 indicating the spatial input 112 in the GUI 300 at the location 114 on the screen. The image subsystem 108 may additionally extract image data (e.g., pixels) 204 corresponding to one or more objects 116 currently displayed on the screen 18. In the example shown, the GUI 300 receives the user input indication 110 indicating the spatial input 112 applied at a first location 114 on the screen 18, wherein the image data 202 includes an object (i.e., a golden retriever) 116 displayed on the screen 18 proximate to the first location 114.

With continued reference to the system 100 of FIG. 1 and the point assistant 200 of FIG. 2, the speech recognizer 210 executes an automatic speech recognition (ASR) model (e.g., a speech recognition model) 212 that receives, as input, the audio data 202 and generates/predicts, as output, a corresponding transcription 214 of the query 104. In the example shown, the query 104 includes the phrase, "what is this?", that requests information 246 about an object 116 displayed in the GUI 300 on the screen without uniquely identifying the object 116. Described in greater detail below, the point assistant 200 uses the spatial input 112 applied at the first location 114 on the screen 118 to disambiguate the query 104 for uniquely identify the object 116 that the query 104 is referring to. Once the object 116 is uniquely identified, the point assistant 200 may obtain the information 246 about the object and generate a response 252 to the query 104 that includes obtained information 246 about the object 116. The response generator 250 may generate the response 252 to the query 104 as a textual representation. Here, the point assistant 200 instructs the user device 10 to display the response 252 in the GUI 300 for the user 102 to read. In the example shown, the point assistant 200 generates a textual representation of the response 252 "That is a golden retriever" for display in the GUI 300. As will be discussed in further detail below, the point assistant 200 may require the additional context extracted by the image subsystem 108 (i.e., that the user 102 applied a spatial input 112 at the first location 114 corresponding to the object 116) in order to uniquely identify the object 116 the query 104 is referring to in order to obtain the information 246 for inclusion in the response 252. In some examples, the response generator 250 employs a text-to-speech (TTS) system 260 to convert the textual representation of the response 252 into synthesized speech. In these examples, the point assistant 200 generates the synthesized speech for audible output from the speaker 19 of the user device 10 in addition to, or in lieu of, displaying the textual representation of the response 252 in the GUI 300.

Referring to FIG. 2, the point assistant 200 further includes a natural language understanding (NLU) module 220 configured to perform query interpretation on the corresponding transcription 214 to ultimately determine a meaning behind the transcription 214. The NLU module 220 may also receive context information 201 to assist with interpreting the transcription 214. The context information 201 may indicate an application 50 (FIG. 1) currently executing on the user device 10, previous queries 104 from the user 102, a particular hotword 105 was detected, or any other information that the NLU module 220 can leverage for interpreting the query 104. Continuing with the example, the context information 201 may indicate that the user is interacting with a web-based application 50 executing on the user device 102 and the NLU module 230 performs query interpretation to determine that the query 104 specifies an action 232 to obtain a description/information about some object 116 displayed in the GUI 300 that the user 102 is likely viewing. However, the NLU module 230 determines that the query 104 is ambiguous since the object 116 is not explicitly identified in the transcription 214 but for the term "this". In other words, query interpretation performed by the NLU module 230 determines that the query 104 refers an object 116 displayed on the screen 18 without uniquely identifying the object 116 and specifies an action 232 to request information 246 about the object 116.

In order to fulfill the query 104, the NLU module 220 needs to disambiguate the query 104 to uniquely identify the object 116 the query 104 is referring to. For example, in a scenario where a query 104 includes a corresponding transcription 214 "show me similar bicycles" while multiple bicycles are currently displayed on the screen 18," the NLU module 220 may perform query interpretation on the corresponding transcription 214 to identify that the user 102 is referring to an object (i.e., a bicycle) 116 displayed in the GUI 300 without uniquely identifying the object 116, and requesting information 246 about the object 116 (i.e., other objects similar to the bicycle 116). In this example, the NLU module 220 determines that query 104 specifies an action 232 to retrieve images of bicycles similar to one of the bicycles displayed on the screen, but cannot fulfil the query 104 because the bicycle that the query is referring to cannot be ascertained from the transcription 214.

The NLU module 220 may use a user input indication indicating a spatial input 112 applied at the first location 114 on the screen as additional context for disambiguating the query 104 to uniquely identify the object 116 the query is referring to. The NLU module 220 may additionally use image data 204 for disambiguating the query 104. Here, the image data 204 may include a plurality of candidate objects displayed in the GUI and corresponding locations of the plurality of candidate objects displayed in the GUI. The image data 204 may be extracted by the image subsystem 108 from graphical content rendered for display in the GUI 300. The image data 204 may include labels that identify the candidate objects. In some examples, the image subsystem 108 performs one or more object recognition techniques on the graphical content in order to identify the candidate objects. By using the image data 204 and the received user input indication the spatial input 118 applied at the first location 114, the NLU module 220 may be able uniquely identify the object as an object rendered for display in the GUI 300 that is closest to the first location 114 of the spatial input 118. In some examples, the content of the transcription 214 can further narrow down the possibility of objects the query refers to by at least describing a type of object or indicating one or more features/characteristics of the object the query refers to. Once the object 116 is uniquely identified, the point assistant 200 adds the object 116 to perform the action 232 of obtaining the information 246 about the object 116 requested by the query 104. Once the point assistant 200 obtains the information 246 about the object 116 requested by the query 104, the response generator 250 provides a response 252 to the query 104 that includes the obtained information 246 about the object 116.

Referring to FIG. 3A, in some implementations, receiving the user input indication 110 indicating the spatial input 112 at the first location 114 includes detecting that a position of a cursor 310 is displayed in a GUI 300a at the first location 114 when the user 102 spoke the query 104. In these implementations, the NLU module 220 further receives image data 204 including a plurality of candidate objects 320, 320a-c displayed in the GUI 300. Each candidate object 320 of the plurality of candidate objects 320 includes a corresponding location 322, 322a-c in the GUI 300a displayed on the screen. These locations may, for example, be quantified or otherwise characterized using one or more coordinate systems such as Cartesian coordinates using a pixel coordinate system where the origin is defined by the bottom left of the GUI 300a, or a polar coordinate system.

In addition, each of the candidate objects 320 may be spatially defined by a bounding box 330a, 330a-c or a box with the smallest measure within which all of the candidate object 320 lies. The NLU module 220 may identify a candidate object 320c from the plurality of candidate objects 320 as having the corresponding location 322c that is closest to the first location 114 as the object 116 the query 104 is referring to. In some examples, where the bounding box 330 of two or more candidate objects 320 overlap, the NLU module 220 may employ a best intersection technique to compute the overlap between the two or more bounding boxes 330 in order to identify the object 116 the query 104 is referring to. In the example shown, the position of the cursor 310 indicates the spatial input 112 is applied at the location 114 where an object 116 that includes the sun is displayed.

In other implementations (not shown), the user input indication 110 indicating the spatial input 112 at the first location 114 includes detecting a touch input received in GUI 300 at the first location 114 when the user 102 spoke the query 104. Alternatively, the user input indication 110 indicating the spatial input 112 at the first location 114 includes detecting a lassoing action performed in the GUI 300 at the first location 114 when the user 102 spoke the query 104.

Figure 3B:
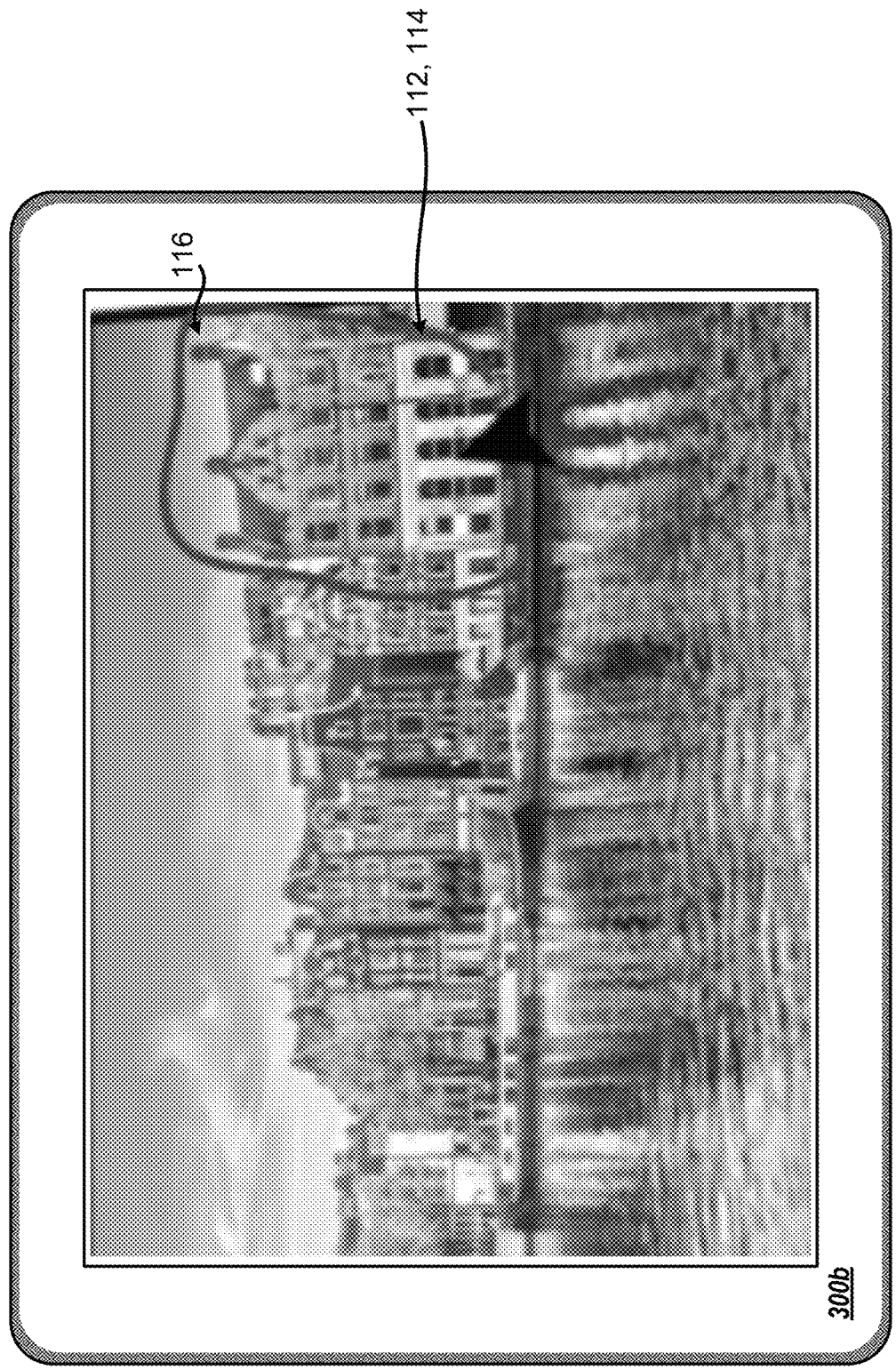

Referring to FIG. 3B, in some implementations, receiving the user input indication 110 indicating the spatial input 112 at the first location 114 includes detecting a lassoing action performed in a GUI 300b at a first location 114. In response to detecting the lassoing action, the NLU module 220 uses the first location 114 in the image data 204, to crop a subset of the image data 204 contained within a region identified by the lassoing action and located at the first location 114 to uniquely identify the object 116 the query 104 is referring to. In the example shown, the object within the region of the lassoing action includes a building.

Figure 3C:
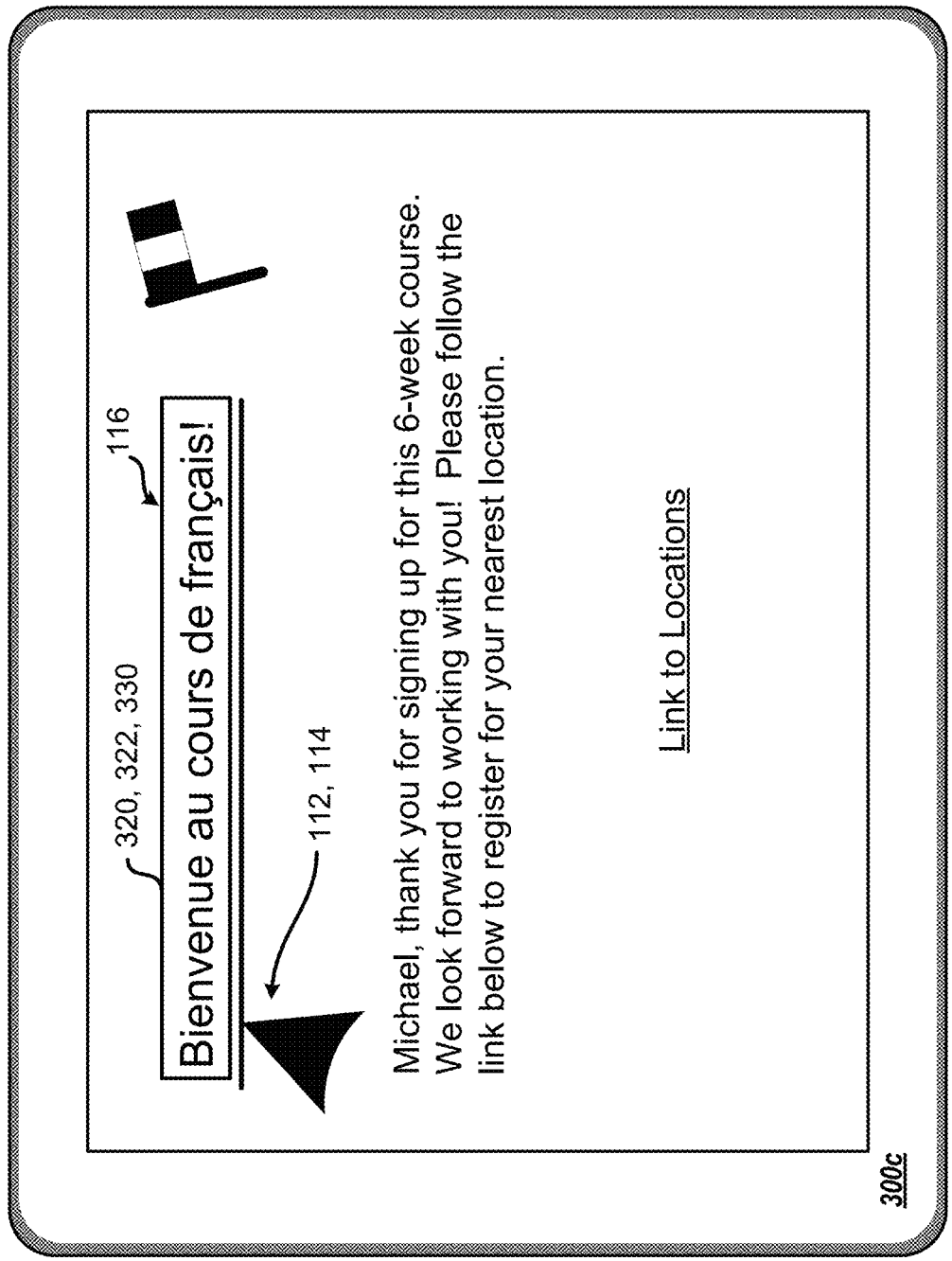

Referring to FIG. 3C, in some implementations, receiving the user input indication 110 indicating the spatial input 112 at the first location includes detecting an underlining action performed in a GUI 300c at a first location 114. In these implementations, the query 104 may be directed to a sequence of characters (e.g., "Bienvenue au cours de français!") displayed in the GUI 300c at the first location 114. For instance, the query 104 may include the phrase "What does this say?" Like in FIG. 3A, the NLU module 220 may identify a candidate object 320 (e.g., the underlined sequence of characters) as having a corresponding location 322 that is closest to the first location 114 as the object 116 the query 104 is referring to. In other implementations (not shown), the user input indication 110 indicating the spatial input 112 at the first location 114 includes detecting a highlighting action performed in the GUI 300c that highlights the sequence of characters (e.g., "Bienvenue au cours de français!") at the first location 114. In these implementations, the disambiguation model 230 disambiguates the query 104 to uniquely identify the object 116 the query is referring to as the sequence of characters highlighted by the highlighting action.

Referring back to FIG. 2, once the NLU 220 disambiguates the query 104 to uniquely identify the object 116, the NLU module 220 inserts the object 116 into a missing object slot of the action 232 and performs the action 232 of obtaining the information 246 about the uniquely identified object 116 requested by the query 104. In some implementations, the point assistant 200 performs the identified action 232 to obtain the information 246 about the object 116 requested by the query 104 by querying an information source 240. In these implementations, the information source 240 may include a search engine 242, where the point assistant 200 queries the search engine 242 using the uniquely identified object 116 and one or more terms in the transcription 214 of the query 104 to obtain the information 246 about the object 116 requested by the query 104. For example, the point assistant 200 queries the search engine to obtain information 238 that includes a description of a golden retriever uniquely identified as the object 116 requested by the query, in addition to the one or more words in the transcription 214 "what is this?" The information source may include an object recognition engine 244 that applies image processing techniques to detect and recognize patterns (i.e., a golden retriever) in the image data 204 in order obtain the information 238 that classifies the object 116 as a golden retriever and provides information about golden retrievers. The information could include a link to a content source (e.g., webpage). That is, the information source 240 may use the image data 204 along with the transcription 214 of the query 104 to obtain the information 246 requested by the query 104. The response generator 250 receives the information 246 requested by the query 104 and generates the response 252 "That is a golden retriever." As discussed above, the response generator 250 may generate the response 252 to the query 104 as a textual representation 19 displayed in the GUI 300 on the screen of the user device 10.

In other examples, the point assistant 200 queries the search engine 242 to obtain a list of results responsive to the query 104. In these examples, the query 104 may be a similarity query 104, where the user 102 seeks a list of results with a visual similarity to the object 116 in the GUI 300 on the screen of the user device 10. Once the information source 240 returns the information 246 including the list of results, the response generator 250 may generate the response 252 to the query 104 as a textual representation 19 including the list of results displayed in the GUI 300 on the screen of the user device 10. When the point assistant 200 displays the response 252, it may further generate a graphical element representing a highest ranked result in the list of results responsive to the query 104, where the highest ranked result is displayed more prominently (e.g., larger font, highlighted color, at the first location 114) than the remaining results in the list of ranked results.

In some implementations, the point assistant 200 determines that the uniquely identified object 116 includes text in a first language (e.g., French). Here, the user 102 that spoke the query 104 may speak only speak a second language (e.g., English) different than the first language. For example, as shown in FIG. 3C, the uniquely identified object 116 includes text in a first language "Bienvenue au cours de français!" When the point assistant queries the information source 240 for information 246 about the object, the information source 240 may obtain a translation of the uniquely identified object 116 in the second language "Welcome to French class!" For instance, the information source 240 may include a text-to-text machine translation model.

Figure 4:
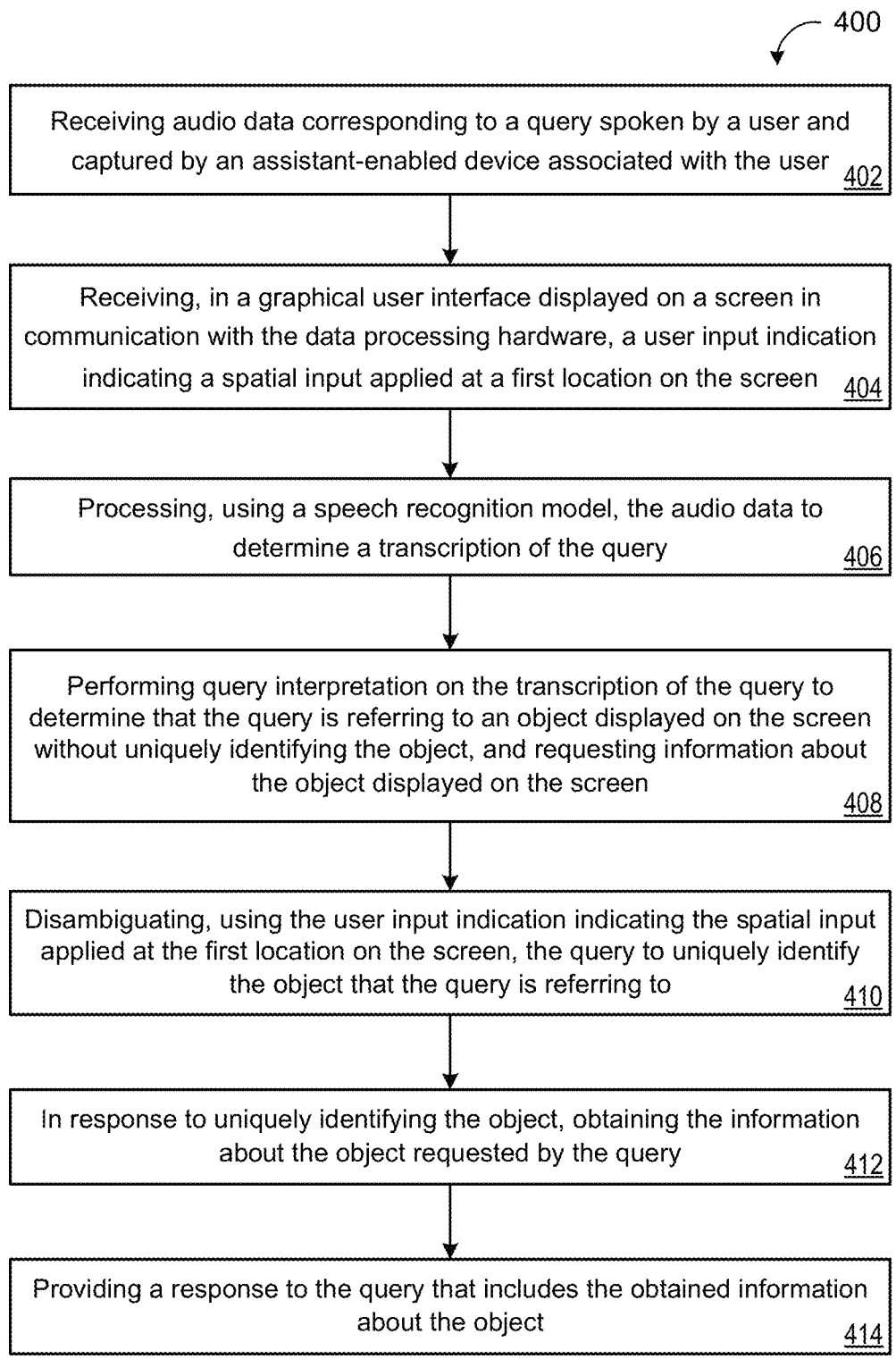
FIG. 4 is a flowchart of an example arrangement of operations for a method of disambiguating a query using mouse pointing or touch cues.

FIG. 4 is a flowchart of an exemplary arrangement of operations for a method 400 for a contextual assistant to use mouse pointing or touch cues. The method 400 includes, at operation 402, receiving audio data 202 corresponding to a query 104 spoken by a user 102 and captured by an assistant-enabled device (e.g., a user device) 10 associated with the user 102. The method 400 further includes, at operation 404, receiving, in a graphical user interface 300 displayed on a screen in communication with data processing hardware 12, a user input indication 110 indicating a spatial input 112 applied at a first location 114 on the screen. At operation 406, the method 400 includes processing, using a speech recognition model 212, the audio data 202 to determine a transcription 214 of the query 104.

At operation 408, the method 400 also includes performing query interpretation on the transcription 214 of the query 104 to determine that the query 104 is referring to an object 116 displayed on the screen without uniquely identifying the object 116, and requesting information 256 about the object 116 displayed on the screen. The method 400 further includes, at operation 410, disambiguating, using the user input indication 110 indicating the spatial input 112 applied at the first location 114 on the screen, the query 104 to uniquely identify the object 116 that the query 104 is referring to. At operation 412, in response to uniquely identifying the object 116, the method 400 includes obtaining the information 246 about the object 116 requested by the query 104. The method 400 further includes, at operation 414, providing a response 252 to the query 104 that includes the obtained information 246 about the object 116.

Figure 5:
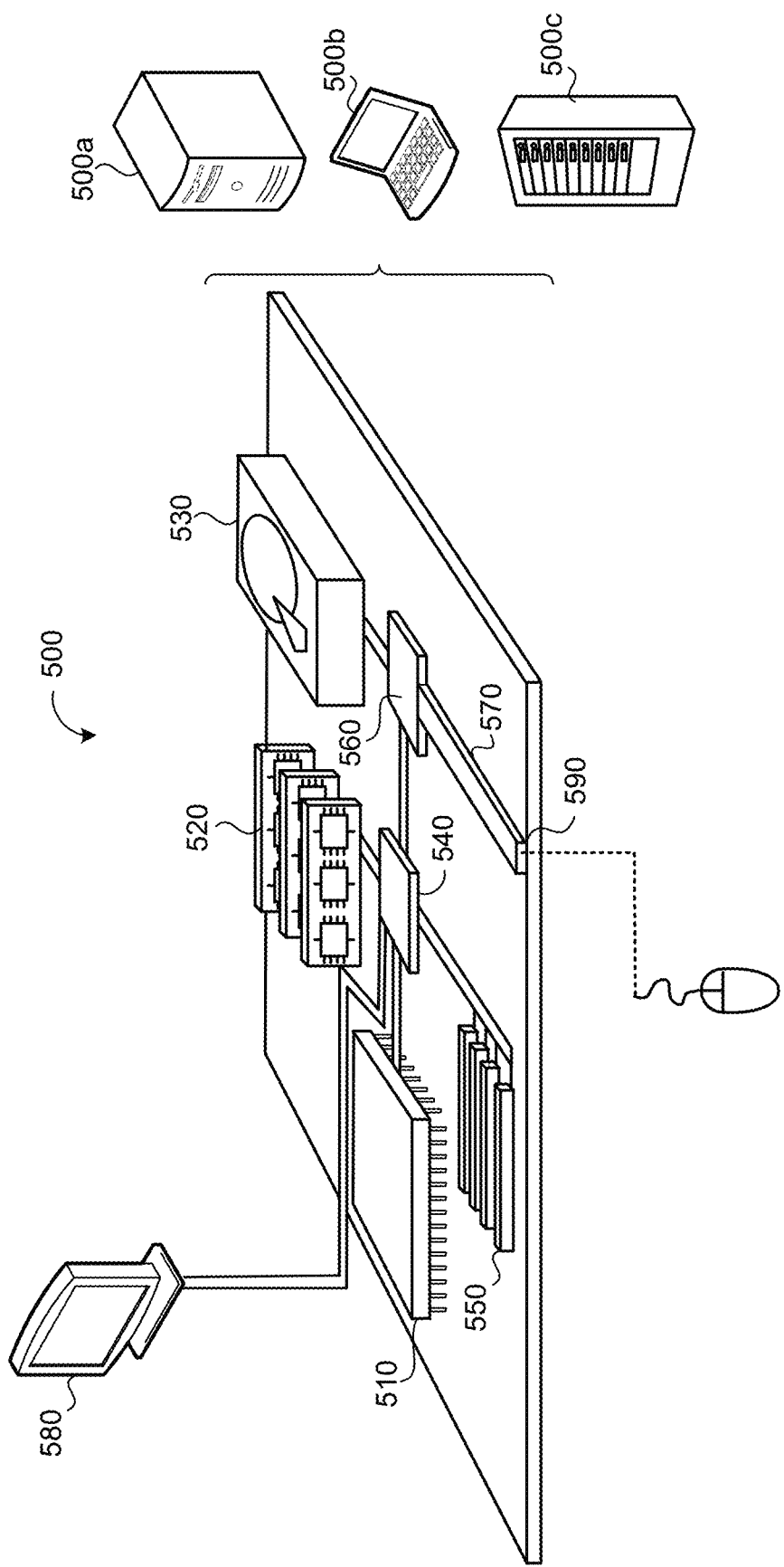
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 (e.g., data processing hardware 12 of FIG. 1) can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 (e.g., memory hardware 14 of FIG. 1) stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving, in a graphical user interface (GUI) displayed on a screen in communication with the data processing hardware, image data comprising a plurality of candidate objects and corresponding locations of the plurality of candidate objects displayed in the GUI;
   detecting a trigger event corresponding to a query issued by a user;
   receiving, in the GUI, a user input indication indicating a spatial input applied at a first location on the screen, the user input indication indicating the spatial input at the first location comprises a highlighting action performed in the GUI that highlights a sequence of text characters at the first location;
   determining the highlighted sequence of text includes text in a first language;
   performing query interpretation on the query to determine that the query is:
      referring to one of the candidate objects displayed on the screen without uniquely identifying the object; and
      requesting a text-to-text machine translation model to obtain a translation of the referred to one of the candidate objects displayed on the screen;
   disambiguating, using the user input indication indicating the spatial input applied at the first location on the screen, the query to uniquely identify the highlighted sequence of text at the first location displayed on the screen as the referred to one of the candidate objects that the query is referring to;
   based on determining the highlighted sequence of text includes text in the first language, querying the text-to-text machine translation model using the highlighted sequence of text to obtain the translation of the highlighted sequence of text in a second language different than the first language; and
   providing a response to the query that includes the translation of the highlighted sequence of text in the second language obtained by the text-to-text machine translation model.

2. The method of claim 1, wherein the operations further comprise, in response to detecting the trigger event, activating:
   the GUI displayed on the screen to enable detection of spatial inputs; and
   a speech recognition model to enable the performance of speech recognition on incoming audio data captured by an assistant-enabled device associated with the user.

3. The method of claim 1, wherein detecting the trigger event comprises:
   receiving audio data corresponding to the query and captured by an assistant-enabled device associated with the user; and
   detecting, by a hotword detector, a presence of a hotword in the received audio data.

4. The method of claim 1, wherein detecting the trigger event comprises one of:
   receiving, in the GUI displayed on the screen, a user input indication indicating selection of a graphical element;
   receiving a user input indication indicating selection of a physical button disposed on an assistant-enabled device associated with the user;
   detecting a predefined gesture performed by the user; or
   detecting a predefined movement/pose of the assistant-enabled device associated with the user.

5. The method of claim 1, wherein:
   receiving the user input indication indicating the spatial input applied at the first location comprises one of:

detecting that a position of a cursor is displayed in the GUI at the first location when the user spoke the query;

detecting a touch input received in the GUI at the first location when the user spoke the query; or detecting a lassoing action performed in the GUI at the first location when the user spoke the query.

6. A system comprising:

data processing hardware; and memory hardware in communication with the data processing hardware, the memory hardware storing instructions that when executed on the data processing hardware cause the data processing hardware to perform operations comprising:

receiving, in a graphical user interface (GUI) displayed on a screen in communication with the data processing hardware, image data comprising a plurality of candidate objects and corresponding locations of the plurality of candidate objects displayed in the GUI;

detecting a trigger event corresponding to a query issued by a user;

receiving, in the GUI, a user input indication indicating a spatial input applied at a first location on the screen, the user input indication indicating the spatial input at the first location comprises a highlighting action performed in the GUI that highlights a sequence of text characters at the first location;

determining the highlighted sequence of text includes text in a first language;

performing query interpretation on the query to determine that the query is:

referring to one of the candidate objects displayed on the screen without uniquely identifying the object; and requesting a text-to-text machine translation model to obtain a translation of the referred to one of the candidate objects displayed on the screen;

disambiguating, using the user input indication indicating the spatial input applied at the first location on the screen, the query to uniquely identify the highlighted sequence of text at the first location displayed on the screen as the referred to one of the candidate objects that the query is referring to;

based on determining the highlighted sequence of text includes text in the first language, querying the text-to-text machine translation model using the highlighted sequence of text to obtain the translation of the highlighted sequence of text in a second language different than the first language; and providing a response to the query that includes the translation of the highlighted sequence of text in the second language obtained by the text-to-text machine translation model.

7. The system of claim 6, wherein the operations further comprise, in response to detecting the trigger event, activating:

the GUI displayed on the screen to enable detection of spatial inputs; and a speech recognition model to enable the performance of speech recognition on incoming audio data captured by an assistant-enabled device associated with the user.

8. The system of claim 6, wherein detecting the trigger event comprises:

receiving audio data corresponding to the query and captured by an assistant-enabled device associated with the user; and detecting, by a hotword detector, a presence of a hotword in the received audio data.

9. The system of claim 6, wherein detecting the trigger event comprises one of:

receiving, in the GUI displayed on the screen, a user input indication indicating selection of a graphical element;

receiving a user input indication indicating selection of a physical button disposed on an assistant-enabled device associated with the user;

detecting a predefined gesture performed by the user; or detecting a predefined movement/pose of the assistant-enabled device associated with the user.

10. The system of claim 6, wherein:

receiving the user input indication indicating the spatial input applied at the first location comprises one of:

detecting that a position of a cursor is displayed in the GUI at the first location when the user spoke the query;

detecting a touch input received in the GUI at the first location when the user spoke the query; or detecting a lassoing action performed in the GUI at the first location when the user spoke the query.

* * * * *